US010373333B2

United States Patent
Yang et al.

(10) Patent No.: US 10,373,333 B2
(45) Date of Patent: Aug. 6, 2019

(54) INTERACTIVE CLOTHES AND ACCESSORIES FITTING METHOD AND DISPLAY SYSTEM THEREOF

(71) Applicant: Wistron Corporation, New Taipei (TW)

(72) Inventors: Jie-Ci Yang, New Taipei (TW); Meng-Chao Kao, New Taipei (TW); Ting-Wei Lin, New Taipei (TW); Hui-Chen Lin, New Taipei (TW); Yu-Ting Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 245 days.

(21) Appl. No.: 15/458,943

(22) Filed: Mar. 14, 2017

(65) Prior Publication Data
US 2018/0122096 A1 May 3, 2018

(30) Foreign Application Priority Data
Nov. 1, 2016 (TW) .............................. 105135310 A (51) Int. Cl.
*G06T 7/73* (2017.01)
*G06T 7/50* (2017.01)
(Continued)

(52) U.S. Cl.
CPC ............ *G06T 7/74* (2017.01); *G06K 9/00369* (2013.01); *G06K 9/6202* (2013.01); *G06T 7/50* (2017.01);
(Continued)

(58) Field of Classification Search
CPC .... H04N 21/21805; G06T 2207/30244; G06T 2207/30196; G06T 2207/30201
See application file for complete search history.

(56) References Cited

U.S. PATENT DOCUMENTS 5,937,081 A * 8/1999 O'Brill .................. G06T 11/00
345/632
6,307,568 B1 * 10/2001 Rom ....................... G06T 19/00
345/629
(Continued)

FOREIGN PATENT DOCUMENTS

CN 101271567 9/2008
CN 201936305 8/2011
(Continued)

OTHER PUBLICATIONS

"Office Action of Taiwan Counterpart Application," dated Dec. 6, 2017, p. 1-p. 12, in which the listed references were cited.

*Primary Examiner* — Pankaj Kumar
*Assistant Examiner* — Timothy R Newlin
(74) *Attorney, Agent, or Firm* — JCIPRNET (57) ABSTRACT

An interactive clothes and accessories fitting method, a display system and a computer-readable recording medium thereof are provided, where the method includes the following steps. While the user is wearing a first apparel, images of the user are continuously captured by using an image capturing device to generate a first image sequence, wherein each first image that forms the first image sequence respectively corresponds to a different pose of the user. While the user is wearing a second apparel, images of the user are continuously captured by using the image capturing device. When a second comparison image corresponding to a specific pose of the user is captured by the image capturing device, a first comparison image corresponding to the specific pose is searched from the first image sequence, and the first comparison image and the second comparison image are simultaneously displayed on a screen.

25 Claims, 7 Drawing Sheets

(51) Int. Cl.
*G06K 9/00* (2006.01)
*G06K 9/62* (2006.01)
*H04N 5/232* (2006.01)
*G06T 11/00* (2006.01)

(52) U.S. Cl.
CPC ............ *G06T 11/00* (2013.01); *H04N 5/232* (2013.01); *H04N 5/23293* (2013.01); *G06K 9/00302* (2013.01); *G06T 2207/30196* (2013.01); *G06T 2207/30201* (2013.01)

(56) References Cited

U.S. PATENT DOCUMENTS

| | | | |
|---|---|---|---|
| 6,795,567 B1* | 9/2004 | Cham | G06T 7/246 382/103 |
| 7,184,047 B1* | 2/2007 | Crampton | G06T 17/00 345/473 |
| 8,525,828 B1* | 9/2013 | Bates | G06T 17/00 345/419 |
| 2002/0073077 A1* | 6/2002 | Lennon | G06Q 30/02 |
| 2004/0227752 A1* | 11/2004 | McCartha | A41H 3/007 345/419 |
| 2005/0234782 A1* | 10/2005 | Schackne | G06Q 30/0601 705/26.1 |
| 2008/0071507 A1* | 3/2008 | Hodgins | G01S 5/16 703/6 |
| 2009/0116766 A1* | 5/2009 | Matsumoto | G06T 19/00 382/311 |
| 2009/0202114 A1* | 8/2009 | Morin | A63F 13/12 382/118 |
| 2009/0284529 A1* | 11/2009 | De Aguiar | G06T 13/40 345/420 |
| 2010/0111370 A1* | 5/2010 | Black | G06K 9/00369 382/111 |
| 2010/0111426 A1* | 5/2010 | Chu | G06K 9/00711 382/209 |
| 2010/0319100 A1* | 12/2010 | Chen | G01B 11/2513 2/69 |
| 2011/0052013 A1* | 3/2011 | Sasahara | G06K 9/00248 382/118 |
| 2011/0096183 A1* | 4/2011 | Robertson | H04N 5/275 348/222.1 |
| 2011/0279475 A1* | 11/2011 | Ikenoue | G06K 9/6204 345/619 |
| 2012/0120015 A1* | 5/2012 | Suggs | G06F 3/017 345/173 |
| 2013/0179288 A1* | 7/2013 | Moses | G06Q 10/00 705/26.1 |
| 2013/0181988 A1* | 7/2013 | Yoo | G06T 17/00 345/420 |
| 2013/0229482 A1* | 9/2013 | Vilcovsky | H04N 7/144 348/14.07 |
| 2013/0279571 A1 | 10/2013 | Li et al. | |
| 2014/0168217 A1* | 6/2014 | Kim | G06T 13/40 345/420 |
| 2014/0176565 A1* | 6/2014 | Adeyoola | G06T 19/006 345/473 |
| 2014/0226900 A1* | 8/2014 | Saban | G02B 5/08 382/165 |
| 2014/0300907 A1* | 10/2014 | Kimmel | A41H 1/02 356/625 |
| 2014/0375635 A1* | 12/2014 | Johnson | G06T 17/20 345/420 |
| 2015/0022550 A1* | 1/2015 | Katpally Reddy | G06T 19/006 345/632 |
| 2015/0154691 A1* | 6/2015 | Curry | G06Q 30/0643 705/27.2 |
| 2015/0350730 A1 | 12/2015 | el Kaliouby et al. | |
| 2016/0035061 A1* | 2/2016 | Gadre | A63F 13/00 345/473 |
| 2016/0261911 A1* | 9/2016 | Soundararajan | H04N 21/44218 |
| 2016/0307029 A1* | 10/2016 | Vaknin | G06K 9/00261 |
| 2017/0004648 A1* | 1/2017 | Li | G02B 27/017 |
| 2017/0011452 A1* | 1/2017 | Beckham | G06Q 30/0643 |
| 2017/0156430 A1* | 6/2017 | Karavaev | A41H 1/02 |

FOREIGN PATENT DOCUMENTS

| | | |
|---|---|---|
| CN | 202653694 | 1/2013 |
| CN | 202736053 | 2/2013 |
| CN | 104854623 | 8/2015 |

* cited by examiner

INTERACTIVE CLOTHES AND ACCESSORIES FITTING METHOD AND DISPLAY SYSTEM THEREOF

CROSS-REFERENCE TO RELATED APPLICATION

This application claims the priority benefit of Taiwan application serial no. 105135310, filed on Nov. 1, 2016. The entirety of the above-mentioned patent application is hereby incorporated by reference herein and made a part of this specification.

TECHNICAL FIELD

The disclosure relates to a display technique, in particular, to an interactive clothes and accessories fitting method and a display system thereof suitably used in a place or an occasion for real-time clothes and accessories fitting and comparison.

BACKGROUND

While a consumer is buying clothes or accessories at a physical store, he/she would normally need to try them on repeatedly to select the most satisfying pieces. However, the consumer may not only feel time-consuming and tedious, but may also occupy a fitting room for a considerable amount of time. One prior art has proposed a virtual clothes fitting product which captures an image of user body or user head by using a camera and adds virtual clothes onto the captured image. The image of the virtual clothes under such simulated environment may not match with the figure of the user and may look unreal. Another prior art has proposed to capture photos or videos while the user is trying on each clothes and to allow the user to compare each clothes fitting effect offline. Such approach may be inconvenient and create another burden for the consumer, and thereby cause adverse user experience.

As information technology has been incorporated into many aspects in our daily life, a significant trend has been towards the development of smart products. Hence, to incorporate the existing products into physical stores for interactive fitting and comparison has become a way to optimize life experiences for the consumer.

SUMMARY OF THE DISCLOSURE

Accordingly, an interactive clothes and accessories fitting method and a display system thereof are provided in the disclosure, where an interactive and real-time comparison is provided while the user is trying on clothes and accessories.

According to one of the exemplary embodiments, the interactive clothes and accessories fitting method is adapted to a display system having an image capturing device and a screen and includes the following steps. While the user is wearing a first apparel, images of the user are captured by using an image capturing device to generate a first image sequence, wherein each first image that forms the first image sequence respectively corresponds to a different pose of the user. While the user is wearing a second apparel, images of the user are captured by using the image capturing device. When a second comparison image corresponding to a specific pose of the user is captured by the image capturing device, a first comparison image corresponding to the specific pose is searched from the first image sequence, and the first comparison image and the second comparison image are simultaneously displayed on the screen.

According to one of the exemplary embodiments, the displays system includes an image capturing device, a screen, a memory, and a processor. The processor is coupled to the image capturing device, the screen, and the memory. The image capturing device is disposed on a same side as the screen. The image capturing device is configured to capture images. The screen is configured to display images. The memory is configured to store data. While the user is wearing a first apparel, the processor captures images of the user by using an image capturing device to generate a first image sequence, wherein each first image that forms the first image sequence respectively corresponds to a different pose of the user. While the user is wearing a second apparel, the processor captures images of the user by using the image capturing device. When the image capturing device captures a second comparison image corresponding to a specific pose of the user, the processor searches for a first comparison image corresponding to the specific pose from the first image sequence, and displays the first comparison image and the second comparison image simultaneously on the screen.

According to one of the exemplary embodiments, the interactive clothes and accessories fitting method is adapted to a display system having an image capturing device and a screen and includes the following steps. A first image sequence corresponding to a first apparel and a second image sequence corresponding to a second apparel are generated, where each first image that forms the first image sequence respectively corresponds to a different pose of a user, and each second image that forms the second image sequence respectively corresponds to a different pose of the user. Next, pairing is performed on the first images and the second images to generate paired image sets, and each of the paired image sets are displayed on the screen in sequence, where the first image and the second image in each of the paired image sets correspond to a same pose.

According to one of the exemplary embodiments, the displays system includes an image capturing device, a screen, a memory, and a processor. The processor is coupled to the image capturing device, the screen, and the memory. The image capturing device is disposed on a same side as the screen. The image capturing device is configured to capture images. The screen is configured to display images. The memory is configured to store data. The processor is configured to generate first image sequence corresponding to a first apparel and a second image sequence corresponding to a second apparel, to perform pairing on the first images and the second images to generate paired image sets, and to display each of the paired image sets on the screen in sequence, where each first image that forms the first image sequence respectively corresponds to a different pose of a user, and each second image that forms the second image sequence respectively corresponds to a different pose of the user, and the first image and the second image in each of the paired image sets correspond to a same pose.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
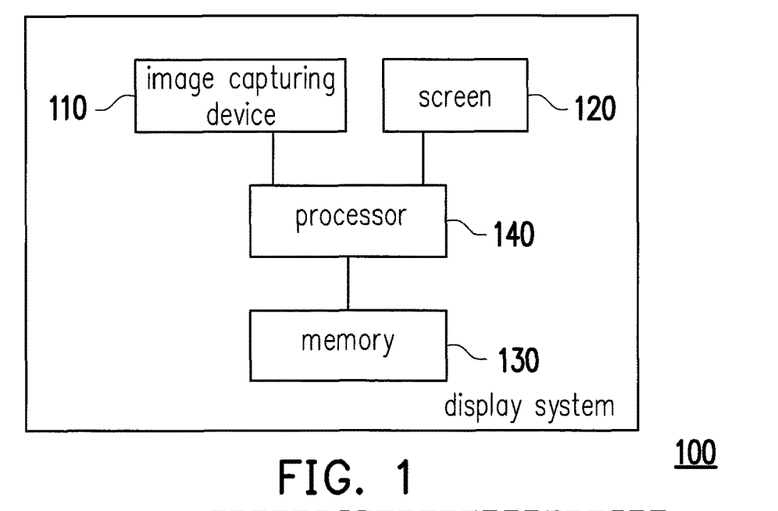
FIG. 1 illustrates a block diagram of a display system in accordance with one of the exemplary embodiments of the disclosure.

FIG. 1 illustrates a block diagram of a display system in accordance with one of the exemplary embodiments of the disclosure. All components of the display system and their configurations are first introduced in FIG. 1. The functionalities of the components are disclosed in more detail in conjunction with FIG. 2.

Referring to FIG. 1, a display system 100 includes an image capturing device 110, a screen 120, a memory 130, and a processor 140. The processor 140 is coupled to the image capturing device 110, the screen 120, and the memory 130. The image capturing device 110 is disposed on the same side as the screen 120. In the present exemplary embodiment, the display system 100 may be an all-in-one display which includes all the image capturing device 110, the screen 120, the memory 130, and the processor 140. In another exemplary embodiment, the display system 100 may be a computer system having the screen 120, the memory 130, and the processor 140 with the externally-connected image capturing device 110. Yet in another exemplary embodiment, the display system 100 may also be an electronic device provided with image capturing and displaying features such as a smart phone, a tabular computer, and so forth. The disclosure is not limited in this regard.

The image capturing device 110 is configured to capture images in front of the screen 120 and includes a camera lens having an optical lens and a sensing element. The sensing element is configured to sense intensity entering the optical lens to thereby generate images. The sensing element may be, for example, charge-coupled-device (CCD) elements, complementary metal-oxide semiconductor (CMOS) elements. The disclosure is not limited in this regard.

The screen 120 is configured to display images for the user to view. In the present exemplary embodiment, the screen 120 may be a liquid crystal display (LCD), a light-emitting diode (LED) display, an organic light-emitting diode (OLED) display, a field emission display (FED), or other types of displays.

The memory 130 is configured to store data such as images and programming codes and may one or a combination of a stationary or mobile random access memory (RAM), a read-only memory (ROM), a flash memory, a hard drive, other similar devices or integrated circuits.

The processor 140 is configured to control the operation among the components of the display system 100 and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices or a combination of aforementioned devices.

Detailed steps of how the display system 100 performs its interactive clothes and accessories fitting method would be illustrated along with each component hereafter.

Figure 2:
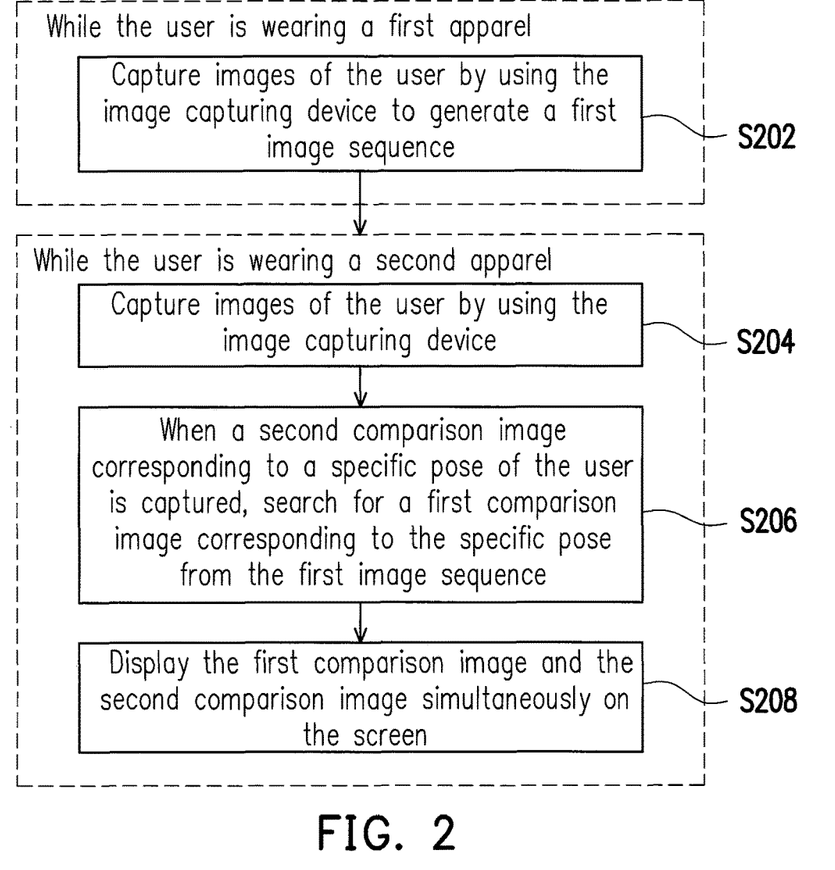
FIG. 2 illustrates a flowchart of an interactive clothes and accessories fitting method in accordance with one of the exemplary embodiments of the disclosure.

FIG. 2 illustrates a flowchart of a proposed interactive clothes and accessories fitting method in accordance with one of the exemplary embodiments of the disclosure.

Referring to both FIG. 1 and FIG. 2, while the user is wearing a first apparel at the front of the screen 120, the processor 140 would capture images of the user by using the image capturing device 110 to generate a first image sequence (Step S202) and store the first image sequence in the memory 130. Herein, a time duration for image capturing may be, for example, 10 seconds. Each image in the first image sequence would respectively correspond to a different pose of the user since the user would pose differently and face toward different angles and directions within the 10 seconds. Each image that forms the first image sequence would be referred to as "a first image" hereafter for convenience sake. Also, those skilled in the part should appreciate that while the image capturing device 110 is capturing the images, the processor 140 would display the captured images on the screen 120 to allow the user to view a fitting effect on the first apparel as if the user is looking at a mirror.

Next, while the user is wearing a second apparel in front of the screen 120, the processor 140 would capture images of the user by using the image capturing device 110 (Step S204). When the processor 140 determines that an image corresponding to a specific pose of the user (referred to as "a second comparison image" hereafter) is captured by the image capturing device 110, the processor 140 searches for an image corresponding to the specific pose (referred to as "a first comparison image" hereafter) from the first image sequence (Step S206) and displays the first comparison image and the second comparison image simultaneously on the screen 120 (Step S208). In detail, while the image capturing device 110 is capturing the images of the user wearing the second apparel, the processor 140 would concurrently determine a current pose of the user from each of the captured images, search for an image closest to the current pose from the first image sequence being captured while the user was wearing the first apparel, and display the two images simultaneously on the screen 120 in split windows so that the user is able to compare the difference between the first apparel and the second apparel. Moreover, when the user wearing the second apparel changes his/her pose, the processor 140 would search for another image closest to the changed pose from the first image sequence for interactive and real-time comparison.

Figure 3A:
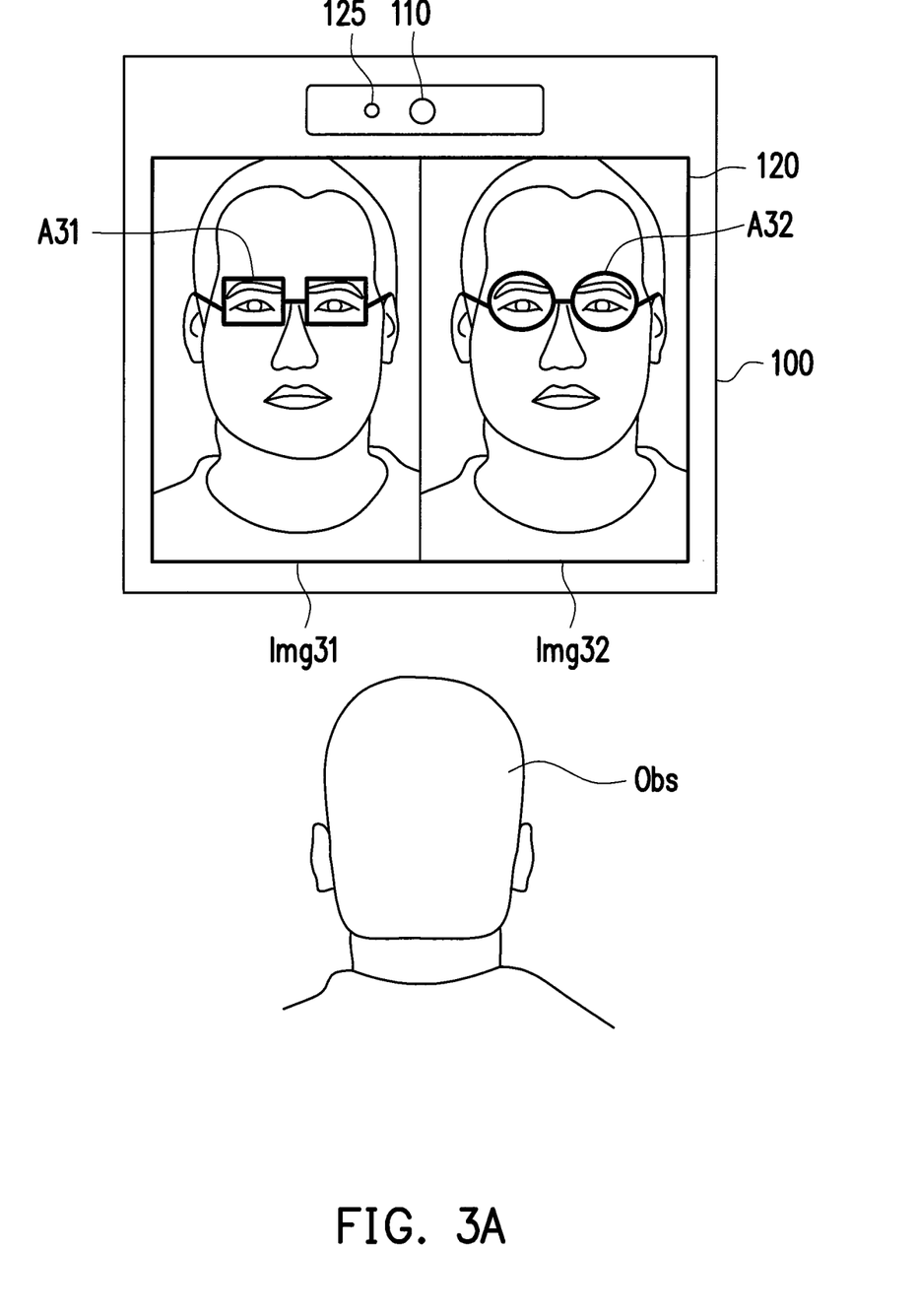
FIG. 3A illustrates a schematic diagram of a first comparison image and a second comparison image in accordance with one of the exemplary embodiments of the disclosure.
Figure 3B:
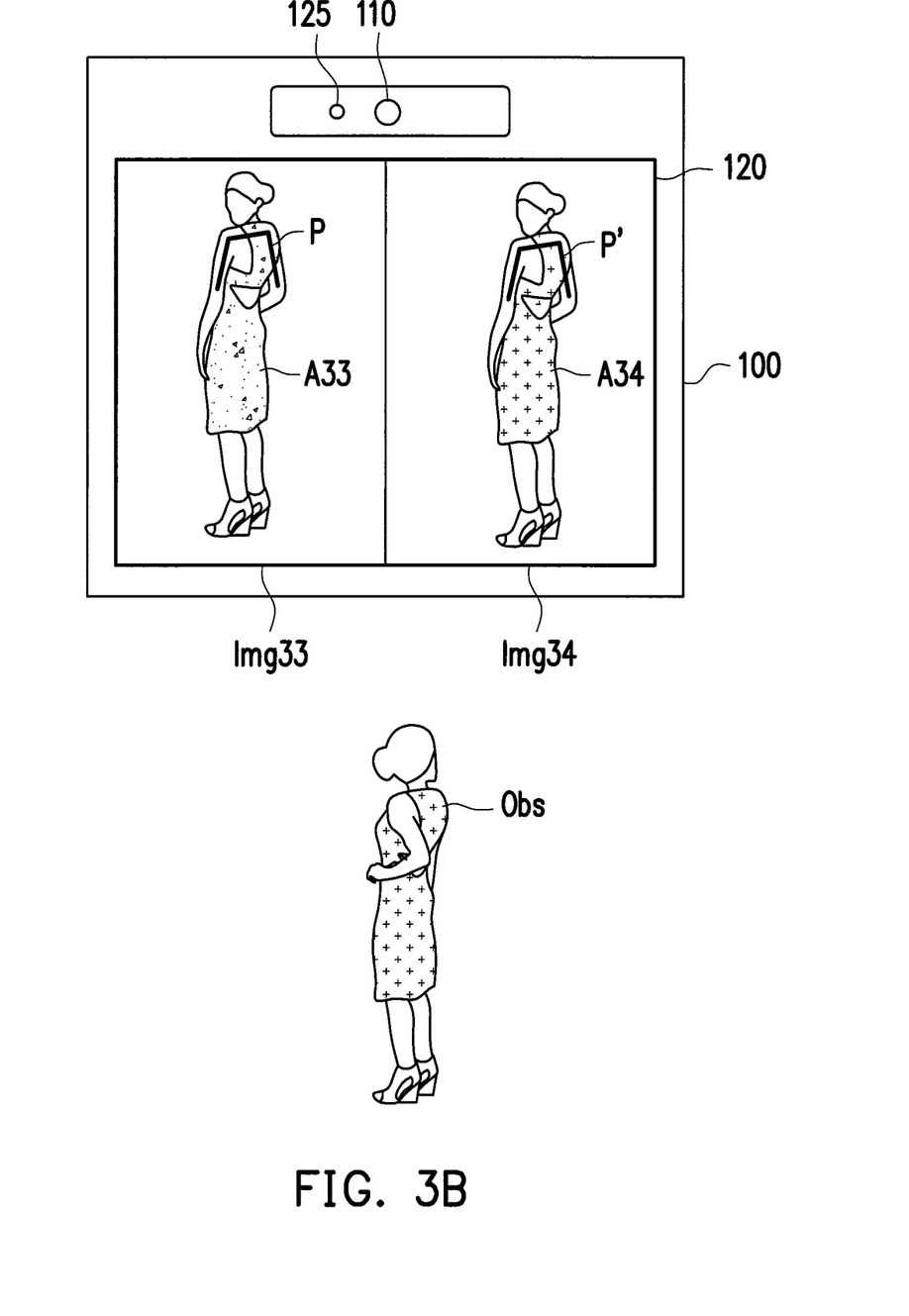
FIG. 3B illustrates a schematic diagram of a first comparison image and a second comparison image in accordance with another one of the exemplary embodiments of the disclosure.

To be specific, FIG. 3A and FIG. 3B illustrate schematic diagrams of a first comparison image and a second comparison image in accordance with one of the exemplary embodiments of the disclosure.

It should be noted that, a depth sensor 125 may be additionally disposed on the same side as the screen 120 of the display apparatus system 100 to more accurately determine poses of the user with the assistance of depth information. The depth sensor 125 is configured to detect depth information in front of the screen 120 and may be categorized into an active depth sensor and a passive depth sensor. The active depth sensor may calculate the depth information in front of the screen 120 by actively transmit signals such as light source, ultrasound, laser, and so forth. On the other hand, the passive depth sensor may be, for example, another image capturing device which captures another image in front of the screen 120 from a different viewing angle simultaneously with the image capturing device 110. The two images captured by the two image capturing devices may be used for calculate the depth information in front of the screen 120.

First referring to FIG. 3A, assume that the first apparel and the second apparel are an eyewear A31 and an eyewear A32. While a user Obs is trying on the eyewear A31, the image capturing device 110 would capture a first image sequence of the user Obs wearing the eyewear A31. Next, while the user Obs is trying on the eyewear A32 and facing toward the front of the screen 120, the image capturing device 110 would capture an image Img2 (i.e. a second comparison image). Meanwhile, the processor 140 would search for an image Img31 of the user also facing toward the front of the screen 120 (i.e. a first comparison image) from the first image sequence and display the image Img31 and the image Img32 simultaneously on the screen 120 in split windows.

Next referring to FIG. 3B, assume that the first apparel and the second apparel are a dress A33 and a dress A34. While the user Obs is trying on the dress A33, the image capturing device 110 would capture a first image sequence of the user Obs wearing the dress A33. Next, while the user Obs is trying on the dress A34 with a 90-degree side standing pose P' in the front of the screen 120, the image capturing device 110 would capture an image Img34 (i.e. a second comparison image). Meanwhile, the processor 140 would search for an image Img33 of the user wearing the dress A33 also with a 90-degree side standing pose P in the front of the screen 120 (i.e. a first comparison image) from the first image sequence and display the image Img33 and the image Img34 simultaneously on the screen 120 in split windows.

It should be noted that, the previous embodiments may be extended to three or more apparels for comparison so that the user is able to compare three or more apparels in split windows. That is, one of the split windows may display a real-time image of the user wearing a specific apparel, and other split windows may display images that are previously stored while the user was trying on other apparels and corresponding to the pose in the real-time image. Moreover, in an exemplary embodiment, the display system 100 may provide the user to select stored images of other apparels to be compared with an apparel that he/she is currently wearing through an operation interface (not shown) for conveniences. The operation interface may be an input device such as a touch screen, a mouse, or a controller. As an example in FIG. 3B, assume that the user has already tried on the dress A33 and the dress A34. When the user tries on another dress with a similar style to the dress A33, the user may be able to select an image of the dress A33 to be compared with an image of the dress that she is currently wearing through the operation interface.

To allow the display system 100 to provide an accurate and robust fitting approach, the processor 140 may construct a codebook by using a captured image sequence. As an example of the first image sequence, the processor 140 may extract features corresponding to the pose in each image to construct a codebook (referred to as "a first codebook" hereafter). The features may be, for example, angle poses formed by multiple feature points, a reference distance between a specific comparison point and a reference object, and so forth. Details would be illustrated hereafter.

In terms of the pose angle, the processor 140 may obtain feature points of the user in each image of an image sequence through image analysis to determine, for example, his/her body pose while trying on clothes or an angle direction of his/her face with respect to the screen 120 while trying on an eyewear. For example, FIG. 4A illustrates a schematic diagram for determining a pose angle of a body in accordance with one of the exemplary embodiments of the disclosure, and FIG. 4B illustrates a schematic diagram for determining a pose angle of a face in accordance with one of the exemplary embodiments of the disclosure.

Figure 4A:
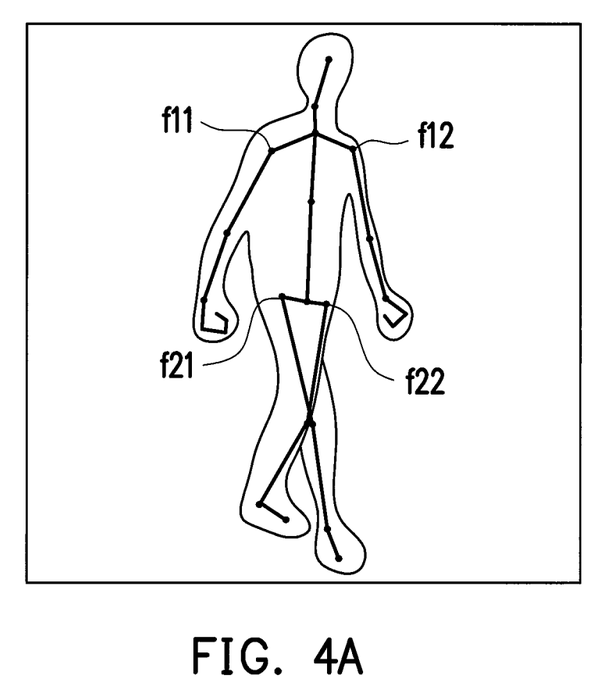
FIG. 4A illustrates a schematic diagram for determining a pose angle of a body in accordance with one of the exemplary embodiments of the disclosure.

First referring to FIG. 4A, the processor 140 may extract feature points f11 and f12 of the user's shoulders and feature points f21 and f22 of the user's waist from an image through any existing image recognition approach, where an angle between a horizontal line and a line formed by the feature points f11 and f12 is $\theta_1$, and an angle between a horizontal line and a line formed by the feature points f21 and f22 is $\theta_2$. Hence, the processor 140 may consider the angle $\theta_1$ and the angle $\theta_2$ as the pose angle of the user in the image and set the pose angle as a parameter to construct the codebook.

Figure 4B:
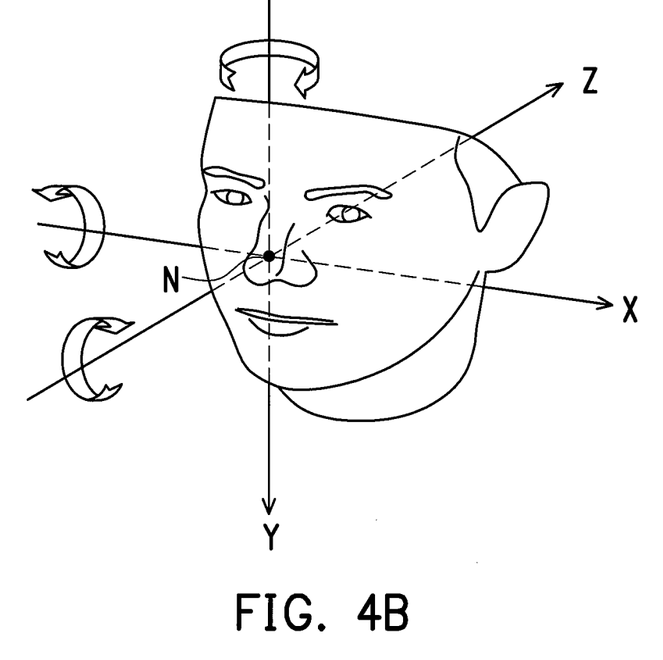
FIG. 4B illustrates a schematic diagram for determining a pose angle of a face in accordance with one of the exemplary embodiments of the disclosure.

Next referring to FIG. 4B, the processor 140 may extract a fixed feature point of the user (e.g. a nose N) from an image through any convention image recognition approach and determine whether its angles ($\theta_X$, $\theta_Y$, $\theta_Z$) with respect to an X-axis representing pitch, a Y-axis representing yaw, and a Z-axis representing roll. The processor 140 may consider the three angles as the pose angle of the user in the image and set the pose angle as a parameter to construct the codebook.

Since the pose angle is estimated only replying on feature points in an image which may be influenced by some external factors, such as user movement, light and shadow variation, and cause some errors, the processor 140 in the present exemplary embodiment may further construct a robust codebook based on a time-splitting method. The first image sequence would be used for illustration herein. Assume that content of each of the first images in the first image sequence is the user's face. Additionally, a demonstration video with different poses may be prestored in the memory 130 for precise calculation. Before or when the image capturing device 110 captures the images of the user, the processor 140 would play the demonstration video on the screen 120 to instruct the user to do the same poses that are beneficial for codebook construction.

First, assume that a rotation speed of the user's face is linear. After the processor 140 extracts a fixed feature point of the user's face in each of the first images and estimates pose angles ($\theta_X$, $\theta_Y$, $\theta_Z$) of the face presented in each of the first images by using, for example, the approach as presented in FIG. 4B, it would obtain two extreme pose angles $\theta_{Xmax}$ and $\theta_{Xmin}$ corresponding to the X-axis, two extreme pose angles $\theta_{Ymax}$ and $\theta_{Ymin}$ corresponding to the Y-axis, and two extreme pose angles $\theta_{Zmax}$ and $\theta_{Zmin}$ corresponding to the Z-axis. Next, the processor may obtain an average pose angle variation of the first image sequence $\Delta\theta_X$, $\Delta\theta_Y$, $\Delta\theta_Z$ and according to the extreme pose angles and the total number of the first images. The formulas for the calculation are as follows:

$$\Delta\theta_X = \frac{\theta_{Xmax} - \theta_{Xmin}}{N}$$

$$\Delta\theta_Y = \frac{\theta_{Ymax} - \theta_{Ymin}}{N}$$

$$\Delta\theta_Z = \frac{\theta_{Zmax} - \theta_{Zmin}}{N}$$

where N is the total number of the first images.

Figure 5:
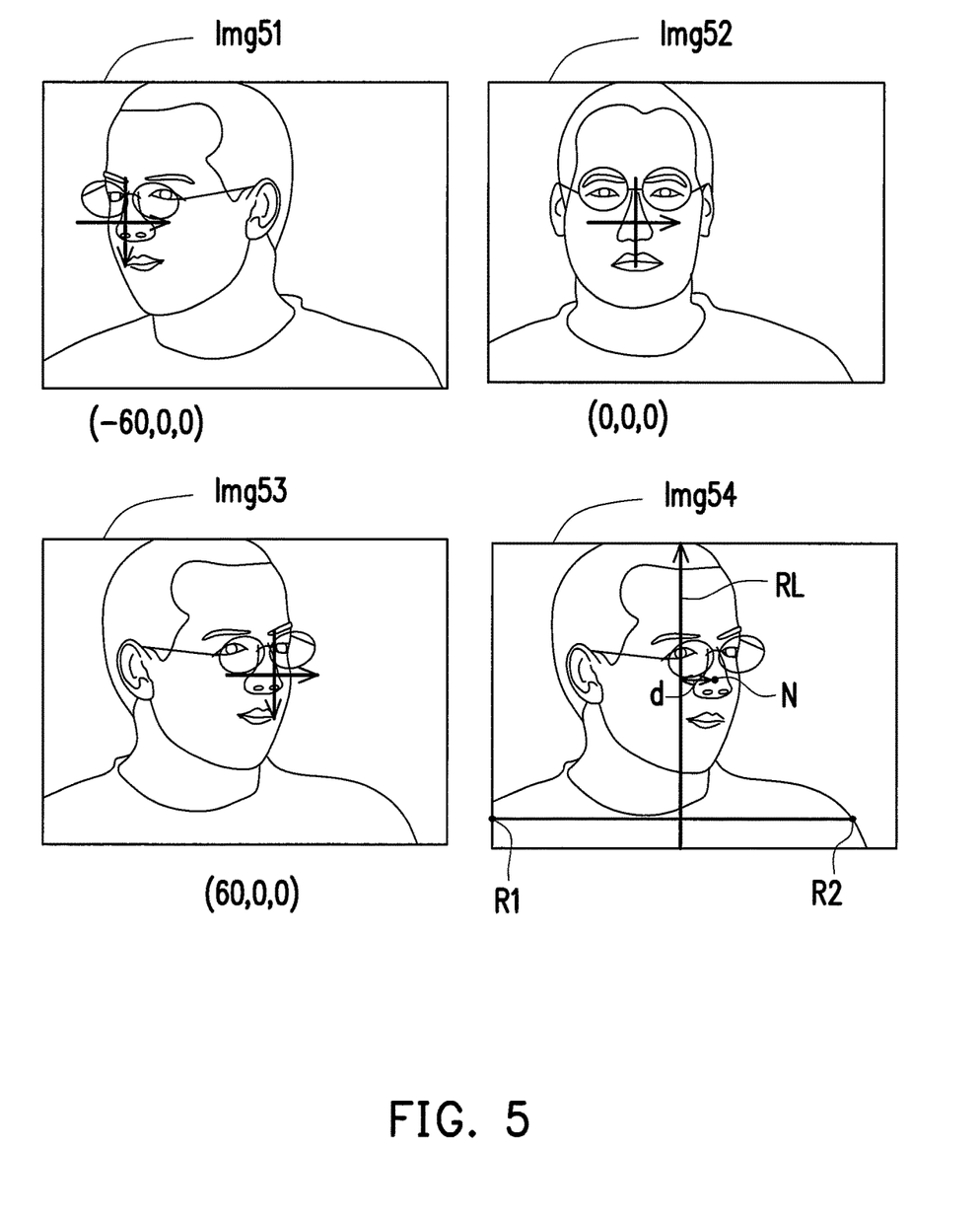
FIG. 5 illustrates a schematic diagram for constructing a codebook in accordance with one of the exemplary embodiments of the disclosure.

For example, FIG. 5 illustrates a schematic diagram for constructing a codebook in accordance with one of the exemplary embodiments of the disclosure. Assume that the user's face only rotates left and right with respect to the Y-axis. When the user is facing toward the screen 120, a corresponding image and a corresponding angle may be Img52 and (0, 0, 0) respectively. Assume that extreme pose angles $\theta_{Ymax}$ and $\theta_{Ymin}$ may be 60 degrees and −60 degrees respectively, and time durations of the use's face turning from 0 degrees towards 60 degrees and −60 degrees are respectively 2 seconds, and a frame rate of the image capturing device 110 is 30 frames per second. Thus, 60 images would be produced after the user's face has been rotating from 0 degrees to 60 degrees, and an average pose angle variation of each image would be 1 degree. Similarly, 60 images would be produced after the user's face has been rotating from 0 degrees to −60 degrees, and an average pose angle variation of each image is −1 degree. Moreover, assume that the user's face also rotates with respect to other axes. Average pose angle variations with respect to other axes may be calculated in a similar fashion and would not be repeated herein.

After the processor 140 obtains the average pose angle variation of the first image sequence, it may set it as the pose angle variation threshold so as to select images from all the first images to construct the codebook (the selected images are referred to as "critical images" hereafter). In detail, the processor 140 may determine whether a pose angle variation in each of the first images is greater than or equal to a pose angle variation threshold, and if yes, the processor 140 may set it as the critical image. The pose angle variation of each of the first images is a difference between its pose angle and the pose angle of its previous image (referred to as "a reference pose angle" hereafter). Assume that a pose angle corresponding to a first image currently being determined $F_i$ is $f_\theta$, and a reference pose angle is $f_R$, and a pose angle variation threshold is $th_\theta$. When $|f_\theta - f_R| \geq th_\theta$, the processor 140 would set the first image $F_i$ as the critical image and update the reference pose angle from $f_R$ to $f_\theta$ so as to reprocess other critical image determinations until all the first images in the first image sequence have been processed. As an example in FIG. 5, the extreme pose angles are 60 degrees and −60 degrees, and the pose angle variation threshold is 1 degree. Ideally, there would be 121 critical images.

Besides the pose angle, a reference distance between a specific comparison point and a reference object may also be a significant parameter to construct the codebook. The comparison point and the reference point would not fluctuate due to facial expression or body pose variation or disappear due to facial or body rotation. First, the processor 140 may define a reference line by using at least two fixed reference points in each of the first images and then calculate a distance between a fixed comparison point and the reference line in each of the first image to obtain the reference distance corresponding to each of the first images. In another exemplary embodiment, the processor 140 may only calculate the reference distance of the critical images to reduce the computational amount. For example, features points R1 and R2 of the user's shoulder in an image Img54 as illustrated in FIG. 5 may be reference points, a perpendicular bisector RL of the two reference points may be a reference line, and the user's nose N may be a comparison point. Hence, a reference distance corresponding to the image Img54 may be a distance d between the comparison point N and the perpendicular bisector RL.

After the processor 140 selects the critical images for codebook construction, it may store each of the critical images as well as the corresponding pose angle and the corresponding reference distance in the first codebook for an accurate and robust comparison. In terms of Step S206 in FIG. 2, once the image capturing device 110 captures the second comparison image corresponding to the specific pose of the user, the processor 140 may obtain the pose angle and the reference distance corresponding to the specific pose of the user (referred to as "a specific pose angle" and "a specific reference distance" respectively hereafter) through image analysis, search for the first image with the angle pose and the reference distance respectively being closest to the specific pose angle and the specific reference distance from the first image sequence according to the first codebook, and set the searched first image as the first comparison image. For example, assume that the specific reference distance is 100 pixels, and the specific pose angle is (0, 10, 0). The processor 140 may search for the first images with the reference distance around 100 pixels from the critical images, therefrom search for the first image with the pose angle having a minimal Euclidean distance away from (0, 10, 0) to be the first comparison image.

The display system 100 is able to provide the following three modes based on the construction of the codebook: a recording mode, an automatic comparing mode, and a manual comparing mode. Details would be illustrated hereafter.

Figure 6:
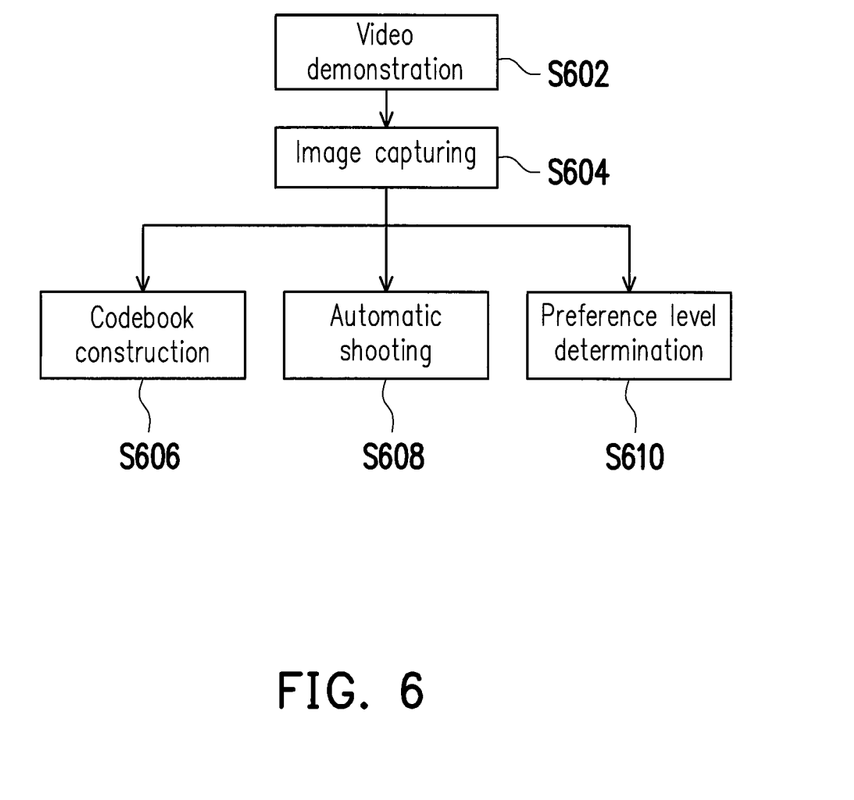
FIG. 6 illustrates a flowchart of an interactive clothes and accessories fitting method in a recording mode in accordance with one of the exemplary embodiments of the disclosure.

FIG. 6 illustrates a flowchart of an interactive clothes and accessories fitting method in a recording mode in accordance with one of the exemplary embodiments of the disclosure. In the present exemplary embodiment, assume that the user is currently wearing the first apparel.

Referring to FIG. 6, while the user is wearing a first apparel, the processor 140 of the display system 100 plays a demonstration video with different poses on the screen 120 (Step S602) to instruct the user to do the same poses. Next, after the image capturing device 110 captures images of the user (Step S604), the processor 140 constructs a codebook accordingly (Step S606). Details of Steps S602-S606 may refer to related description in the previous embodiments and would not be repeated hereafter.

On the other hand, when the image capturing device 110 captures a first preset image corresponding to a preset pose of the user, it shoots the first preset image (S608). For example, assume that the preset pose is a 90-degree side standing pose. When the processor 140 determines that an image of the user with a 90-degree side standing pose is captured by the image capturing device 110, it may determine that such image is the first preset image and thereby shoot such image. Next, the processor 140 may store the first preset image in the memory 130 or upload the first preset image to the cloud by using an additional transmission module (not shown) for the user to download.

Moreover, the processor 140 further performs at least one of facial expression recognition and heartbeat recognition of the user in each of the first images to accordingly determine a preference level of the user on the first apparel (Step S610). Herein, the processor 140 may identify whether the user smiles in each of the first images by using any existing image recognition approach. Moreover, since some users may not have any notable facial expression during shopping, the processor 140 may perform heartbeat recognition on green pixels of a facial area in each of the first images so as to identify the preference level of the user on the first apparel with the assistance of heartbeat detection. The processor 140 may input the recognized facial expression and heartbeat features into a support vector machines (SVM) emotion classifier for emotion classification so as to accordingly suggest other types of merchandises on a basis of the preference level of the user on the first apparel.

When the preference level of the user on the first apparel is high, the processor 140 may display other apparels related to the first apparel on the screen 120 as suggested merchandises to create a commercial effect. For example, such other apparels may be other apparels with the same style or color as the first apparel, other apparels bought by other buyers of the first apparel, apparel-matching suggestion on the first apparel, and so on.

Figure 7:
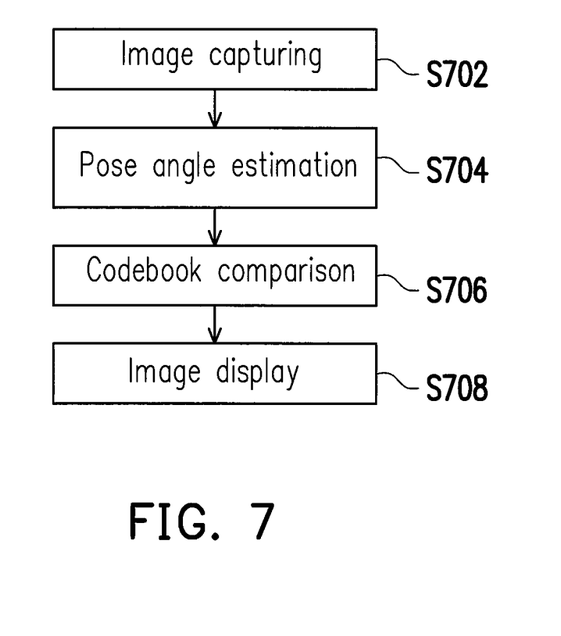
FIG. 7 illustrates a flowchart of an interactive clothes and accessories fitting method in an automatic comparing mode in accordance with one of the exemplary embodiments of the disclosure.

On the other hand, FIG. 7 illustrates a flowchart of an interactive clothes and accessories fitting method in an automatic comparing mode in accordance with one of the exemplary embodiments of the disclosure. In the present exemplary embodiment, assume that the user is currently wearing the second apparel and has already tried on the first apparel.

Referring to FIG. 7, while the user is wearing the second apparel and standing in front of the screen 120 of the display system 100, the processor 140 captures images of the user by using the image capturing device 110 (Step S702) and perform pose angle estimation on the captured images (Step S704). Next, the processor 140 performs comparison by using the first codebook of the first apparel (Step S706) to search for a corresponding first image from the first image sequence and displays the searched first image and the image of the user currently being captured simultaneously on the screen 120 (Step S708) so that the user is able to compare the difference between the first apparel and the second apparel at the same time. Details of Steps S702-S708 may refer to related description in the previous embodiments and would not be repeated hereafter.

Figure 8:
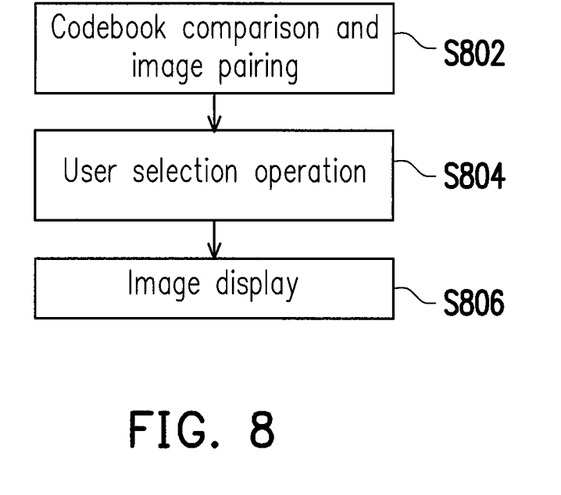
FIG. 8 illustrates a flowchart of an interactive clothes and accessories fitting method in a manual comparing mode in accordance with one of the exemplary embodiments of the disclosure.

FIG. 8 illustrates a flowchart of an interactive clothes and accessories fitting method in a manual comparing mode in accordance with one of the exemplary embodiments of the disclosure. The manual comparing mode is similar to the automatic comparing mode as illustrated in FIG. 7. The difference is that the manual comparing mode allows the user to perform offline comparison through a selection operation after an image capturing process is completed (i.e. after apparel fitting). In the present exemplary embodiment, assume that the user has already tried on the first apparel and the second apparel. In other words, a first image sequence and a second image sequence as well as their corresponding first codebook and second codebook have been stored in the memory 130.

Referring to FIG. 8, the processor 140 perform comparison on the two image sequences by using the first codebook and the second codebook (Step S802) so as to perform pairing on images with similar poses. Hence, the processor 140 is able to display two images of the user respectively wearing the first apparel and the second apparel with similar poses on the screen 120 in split windows in the follow-up steps. The processor 140 may select one of the codebooks as a reference codebook to be paired with the other codebook to generate multiple paired image sets. Next, the processor 140 receives a selection operation performed on the operation interface by the user (Step S804) and accordingly changes an image set to be displayed on the screen 120 (Step 806).

For example, the user may change two images displaying on the screen 120 in split windows by using a slide gesture. Assume that facial angles of the two images currently being displayed on the screen 120 are both $\theta_f$. When the user swipes his finger to the right, facial angles of two images displayed on the screen 120 would be both $(\theta_f+\delta)$, where $\delta$ denotes a pose angle variation. On the other hand, when the user swipes his finger to the left, facial angles of two images displayed on the screen 120 would be both $(\theta_f-\delta)$. Hence, the user is able to offline compare apparels that have been tried on.

In summary, in the interactive clothes and accessories fitting method and the display system thereof proposed in the disclosure, image capturing is performed while the user is trying on different clothes, and an image most similar to a current pose is searched from the captured images corresponding to other apparels to provide the user an interactive and real-time comparison during fitting. Hence, the number of times that the user repeatedly tries on a same apparel as well as his/her shopping time may be reduced, and shopping experiences at physical stores for the user may be thereby optimized.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An interactive clothes and accessories fitting method, adapted to a display system having an image capturing device and a screen, and comprising the following steps:
   while a user is wearing a first apparel, capturing a plurality of images of the user wearing the first apparel by using the image capturing device to generate a first image sequence, wherein each first image that forms the first image sequence respectively corresponds to a different pose of the user;
   obtaining a pose angle and a reference distance corresponding to the pose of the user in each of the first images through image analysis to accordingly construct a first codebook; and
   while the user is wearing a second apparel:
      capturing a plurality of images of the user wearing the second apparel by using the image capturing device; and
      when a second comparison image corresponding to a specific pose of the user is captured by the image capturing device, obtaining a specific pose angle and a specific reference distance of the specific pose of the user through image analysis, searching for a first comparison image corresponding to the specific pose from the first image sequence according to the first codebook, and displaying the first comparison image and the second comparison image simultaneously on the screen, wherein the first comparison image is the first image with the pose angle and the reference distance respectively being closest to the specific pose angle and the specific reference distance.

2. The interactive clothes and accessories fitting method according to claim 1, wherein the step of constructing the first codebook comprises:
   determining whether a pose angle variation in each of the first images is greater than or equal to a pose angle variation threshold;
   setting each of the first images with the pose angle variation being greater than or equal to the pose angle variation threshold as a critical image; and
   recording each of the critical images as well as the pose angle and the reference distance thereof in the first codebook.

3. The interactive clothes and accessories fitting method according to claim 2, wherein the step of obtaining the pose angle variation threshold comprises:
   obtaining two extreme pose angles from the pose angles;
   obtaining an average pose angle variation of the first images according to the extreme pose angles and the total number of the first images; and
   setting the pose angle variation threshold according to the average pose angle variation.

4. The interactive clothes and accessories fitting method according to claim 1, wherein the step of obtaining the pose angle and the reference distance corresponding to the pose of the user in each of the first images comprises:
   defining a reference line by using at least two fixed reference points in each of the first images; and
   calculating a distance between a fixed comparison point and the reference line in each of the first image to obtain the reference distance corresponding to each of the first images.

5. The interactive clothes and accessories fitting method according to claim 1, wherein before the step of capturing the images of the user wearing the first apparel by using the image capturing device, the interactive clothes and accessories fitting method further comprises:
   playing a demonstration video with a plurality of demonstrated poses on the screen.

6. The interactive clothes and accessories fitting method according to claim 1, wherein while the user is wearing the first apparel, when a first preset image corresponding to a preset pose of the user is captured by the image capturing device, the interactive clothes and accessories fitting method further comprises:
   shooting the first preset image by using the image capturing device.

7. The interactive clothes and accessories fitting method according to claim 1, wherein after the step of generating the first image sequence, the interactive clothes and accessories fitting method further comprises:
   performing at least one of facial expression recognition and heartbeat recognition on the user in each of the first images to accordingly determine a preference level of the user on the first apparel.

8. The interactive clothes and accessories fitting method according to claim 7, wherein when the preference level of the user on the first apparel is high, suggesting other apparels related to the first apparel.

9. A display system comprising:
   an image capturing device, configured to capturing images;
   a screen, configured to display images, wherein the image capturing device is disposed at a same side as the screen;
   a memory, configured to store data; and
   a processor, coupled to the image capturing device, the screen, and the memory, and configured to execute the following steps:
      while a user is wearing a first apparel, capturing a plurality of images of the user wearing the first apparel by using the image capturing device to generate a first image sequence, wherein each first image that forms the first image sequence respectively corresponds to a different pose of the user;
      obtaining a pose angle and a reference distance corresponding to the pose of the user in each of the first images through image analysis to accordingly construct a first codebook; and
      while the user is wearing a second apparel:
         capturing a plurality of images of the user wearing the second apparel by the image capturing device; and when a second comparison image corresponding to a specific pose of the user is captured by the image capturing device, obtaining a specific pose angle and a specific reference distance of the specific pose of the user through image analysis, searching for a first comparison image corresponding to the specific pose from the first image sequence according to the first codebook, and displaying the first comparison image and the second comparison image simultaneously on the screen, wherein the first comparison image is the first image with the pose angle and the reference distance respectively being closest to the specific pose angle and the specific reference distance.

10. The display system according to claim 9, wherein the processor determines whether a pose angle variation in each of the first images is greater than or equal to a pose angle variation threshold, sets each of the first images with the pose angle variation being greater than or equal to the pose angle variation threshold as a critical image, and records each of the critical images as well as the pose angle and the reference distance thereof in the first codebook.

11. The display system according to claim 10, wherein the processor obtains two extreme pose angles from the pose angles, obtains an average pose angle variation of the first images according to the extreme pose angles and the total number of the first images, and sets the pose angle variation threshold according to the average pose angle variation.

12. The display system according to claim 9, wherein the processor defines a reference line by using at least two fixed reference points in each of the first images, and calculates a distance between a fixed comparison point and the reference line in each of the first image to obtain the reference distance corresponding to each of the first images.

13. The display system according to claim 9, wherein the memory prestores a demonstration video with a plurality of demonstrated poses, and wherein the processor further plays the demonstration video on the screen.

14. The display system according to claim 9, wherein while the user is wearing the first apparel, when a first preset image corresponding to a preset pose of the user is captured, the processor further shoots the first preset image by using the image capturing device.

15. The display system according to claim 9, wherein the processor performs at least one of facial expression recognition and heartbeat recognition on the user in each of the first images to accordingly determine a preference level of the user on the first apparel.

16. The display system according to claim 15, wherein the processor furrier suggests other apparels related to the first apparel when determining that the preference level of the user on the first apparel is high.

17. The display system according to claim 9 further comprising:
a depth sensor, coupled to the processor and disposed at the same side as the screen, and configured to detect depth information in front of the screen, and wherein the processor further obtains the pose angle and the reference distance corresponding to the pose in each of the first images of the user according to the detected depth information through image analysis.

18. An interactive clothes and accessories fitting method, adapted to a display system having an image capturing device and a screen, and comprising the following steps:
generating a first image sequence corresponding to a first apparel and a second image sequence corresponding to a second apparel, wherein each first image that forms the first image sequence respectively corresponds to a different pose of a user, and wherein each second image that forms the second image sequence respectively corresponds to a different pose of the user;
obtaining a pose angle and a reference distance corresponding to the pose of the user in each of the first images and the second images through image analysis to accordingly construct a first codebook and a second codebook respectively;
performing pairing on the first images and the second images to generate a plurality of paired image sets according to the first codebook and the second codebook, wherein the first image and the second image in each of the paired image sets correspond to a same pose, wherein the paired image sets comprise a specific paired image set having a first comparison image and a second comparison image, wherein the second comparison image is the second image with the pose angle and the reference distance respectively being closest to the pose angle and the reference distance of the first comparison image; and
displaying at least one of the paired image sets on the screen in sequence.

19. The interactive clothes and accessories fitting method according to claim 18, wherein the step of performing pairing on the first images and the second images to generate the paired image sets comprises:
searching the second image corresponding to each of the first image from the second image sequence according to the first codebook and the second codebook to generate each of the paired image sets.

20. The interactive clothes and accessories fitting method according to claim 18 further comprises:
receiving a selection operation performed on another specific pose by the user; and
displaying the paired image set corresponding to the another specific pose on the screen.

21. A display system comprising:
an image capturing device, configured to capturing images;
a screen, configured to display images, wherein the image capturing device is disposed at a same side as the screen;
a memory, configured to store data; and
a processor, coupled to the image capturing device, the screen, and the memory, and configured to execute the following steps:
generating a first image sequence corresponding to a first apparel and a second image sequence corresponding to a second apparel, wherein each first image that forms the first image sequence respectively corresponds to a different pose of a user, and wherein each second image that forms the second image sequence respectively corresponds to a different pose of the user;
obtaining a pose angle and a reference distance corresponding to the pose of the user in each of the first images and the second images through image analysis to accordingly construct a first codebook and a second codebook respectively;
performing pairing on the first images and the second images to generate a plurality of paired image sets according to the first codebook and the second codebook, wherein the first image and the second image in each of the paired image sets correspond to a same pose, wherein the paired image sets comprise a specific paired image set having a first comparison image and a second comparison image, wherein the second comparison image is the second image with the pose angle and the reference distance respectively being closest to the pose angle and the reference distance of the first comparison image; and displaying at least one of the paired image sets on the screen in sequence.

22. The display system according to claim 21, wherein the processor searches the second image corresponding to each of the first image from the second image sequence according to the first codebook and the second codebook to generate each of the paired image sets.

23. The display system according to claim 21, wherein the processor further receives a selection operation performed on another specific pose by the user and displays the paired image set corresponding to the another specific pose on the screen.

24. An interactive clothes and accessories fitting method, adapted to a display system having an image capturing device and a screen, and comprising the following steps:

while a user is wearing a first apparel, capturing a plurality of images of the user wearing the first apparel by using the image capturing device to generate a first image sequence, wherein each first image that forms the first image sequence respectively corresponds to a different pose of the user;

obtaining a pose angle and a reference distance corresponding to the pose of the user in each of the first images through image analysis;

determining whether a pose angle variation in each of the first images is greater than or equal to a pose angle variation threshold;

setting each of the first images with the pose angle variation being greater than or equal to the pose angle variation threshold as a critical image; and recording each of the critical images as well as the pose angle and the reference distance thereof to accordingly construct a first codebook;

while the user is wearing a second apparel:
    capturing a plurality of images of the user wearing the second apparel by using the image capturing device; and
    when a second comparison image corresponding to a specific pose of the user is captured by the image capturing device, searching for a first comparison image corresponding to the specific pose from the first image sequence according to the first codebook, and displaying the first comparison image and the second comparison image simultaneously on the screen.

25. A display system comprising:

an image capturing device, configured to capturing images;

a screen, configured to display images, wherein the image capturing device is disposed at a same side as the screen;

a memory, configured to store data; and a processor, coupled to the image capturing device, the screen, and the memory, and configured to execute the following steps:

while a user is wearing a first apparel, capturing a plurality of images of the user wearing the first apparel by using the image capturing device to generate a first image sequence, wherein each first image that forms the first image sequence respectively corresponds to a different pose of the user;

obtaining a pose angle and a reference distance corresponding to the pose of the user in each of the first images through image analysis;

determining whether a pose angle variation in each of the first images is greater than or equal to a pose angle variation threshold;

setting each of the first images with the pose angle variation being greater than or equal to the pose angle variation threshold as a critical image; and recording each of the critical images as well as the pose angle and the reference distance thereof to accordingly construct a first codebook; and while the user is wearing a second apparel:
    capturing a plurality of images of the user wearing the second apparel by the image capturing device; and
    when a second comparison image corresponding to a specific pose of the user is captured by the image capturing device, searching for a first comparison image corresponding to the specific pose from the first image sequence according to the first codebook, and displaying the first comparison image and the second comparison image simultaneously on the screen.

* * * * *